(12) United States Patent
Haranger

(10) Patent No.: US 12,399,298 B1
(45) Date of Patent: Aug. 26, 2025

(54) SPECTRAL ALIGNMENT METHOD FOR INDUCED GAMMA RAY LOGGING

(71) Applicant: SCHLUMBERGER TECHNOLOGY CORPORATION, Sugar Land, TX (US)

(72) Inventor: Fabien Haranger, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 19/111,321

(22) PCT Filed: Sep. 28, 2023

(86) PCT No.: PCT/US2023/075318
§ 371 (c)(1),
(2) Date: Mar. 13, 2025

(87) PCT Pub. No.: WO2024/076861
PCT Pub. Date: Apr. 11, 2024

Related U.S. Application Data

(60) Provisional application No. 63/378,280, filed on Oct. 4, 2022.

(51) Int. Cl.
*G01V 5/10* (2006.01)
*G01V 13/00* (2006.01)

(52) U.S. Cl.
CPC .............. *G01V 13/00* (2013.01); *G01V 5/101* (2013.01)

(58) Field of Classification Search
None
See application file for complete search history.

(56) References Cited

U.S. PATENT DOCUMENTS

| | | |
|---|---|---|
| 3,521,064 A | 7/1970 | Moran |
| 4,471,435 A | 9/1984 | Meisner |
| 4,712,424 A | 12/1987 | Herron |

(Continued)

FOREIGN PATENT DOCUMENTS

| | | |
|---|---|---|
| WO | 2024076602 A1 | 4/2024 |
| WO | 2024076848 A2 | 4/2024 |

OTHER PUBLICATIONS

International Search Report and Written Opinion of International Patent Application No. PCT/US2023/075318 dated on Mar. 21, 2024, 12 pages.

(Continued)

*Primary Examiner* — Marcus H Taningco
(74) *Attorney, Agent, or Firm* — Jeffrey D. Frantz

(57) ABSTRACT

A method for gain correcting a gamma ray spectrum includes acquiring a gamma ray spectrum including gamma ray counts distributed into a plurality of energy channels, evaluating the acquired gamma ray spectrum to determine an energy of a calibration feature therein, comparing the energy of the calibration feature in the acquired spectrum to a standard spectral energy to determine a deviation between the energy of the calibration feature and the standard spectral energy, and adjusting the acquired spectrum so that the energy of the calibration feature is equal to the standard spectral energy to obtain a gain calibrated spectrum.

20 Claims, 10 Drawing Sheets

(56) References Cited

U.S. PATENT DOCUMENTS

| | | | |
|---|---|---|---|
| 5,360,975 A * | 11/1994 | Stoller | G01V 5/04 |
| | | | 250/369 |
| 5,369,578 A | 11/1994 | Roscoe | |
| 5,374,823 A | 12/1994 | Odom | |
| 6,150,655 A | 11/2000 | Odom | |
| 6,376,838 B1 | 4/2002 | Odom | |
| 7,205,535 B2 | 4/2007 | Madigan | |
| 8,311,744 B2 | 11/2012 | Khisamutdinov | |
| 8,868,346 B2 | 10/2014 | Evans | |
| 10,162,079 B2 | 12/2018 | Tkabladze | |
| 10,209,378 B2 * | 2/2019 | Galford | G01V 13/00 |
| 2010/0302034 A1 * | 12/2010 | Clements | G01V 5/234 |
| | | | 715/764 |
| 2012/0197529 A1 | 8/2012 | Stephenson | |
| 2013/0211724 A1 | 8/2013 | Fitzgerald | |
| 2016/0003969 A1 | 1/2016 | Zhou | |
| 2016/0195636 A1 | 7/2016 | Grau | |
| 2016/0370494 A1 * | 12/2016 | Zhou | G01T 1/20 |
| 2017/0146684 A1 | 5/2017 | Tkabladze | |
| 2018/0059283 A1 | 3/2018 | Xu | |
| 2020/0191992 A1 | 6/2020 | Inanc | |
| 2021/0003737 A1 | 1/2021 | Whetton | |
| 2022/0291415 A1 | 9/2022 | Inanc et al. | |

OTHER PUBLICATIONS

Evans, M, et al., "A Sourceless Alternative to Conventional LWD Nuclear Logging", SPE 62982, presented at the 2000 SPE Annual Technical Conferene and Exhibition, Dallas, Texas, USA, 8 pages.

Evans, M. et al., "Sourceless Neutron-Gamma Density (SNGD): A Radioisotope-Free Bulk Density Measurement: Physics Principles, Environmental Effects, and Applications", SPE-159334-PP, presented at the 2012 SPE Annual Technical Conference and Exhibition, San Antonio, Texas, USA, 18 pages.

International Search Report and Written Opinion of International Patent Application No. PCT/US2023/034418 dated on Mar. 5, 2024, 09 pages.

International Search Report and Written Opinion issued in the PCT Application No. PCT/US2023/075037 dated Mar. 21, 2024, 16 pages.

* cited by examiner

SPECTRAL ALIGNMENT METHOD FOR INDUCED GAMMA RAY LOGGING

CROSS REFERENCE TO RELATED APPLICATIONS

This application is the National Stage Entry of International Application No. PCT/US2023/075318, filed Sep. 28, 2023, which claims the benefit of U.S. Provisional Application No. 63/378,280, entitled "SPECTRAL ALIGNMENT METHOD FOR INDUCED GAMMA RAY LOGGING," filed Oct. 4, 2022, the disclosure of which is hereby incorporated herein by reference.

BACKGROUND

Nuclear spectroscopy measurements have been used in the oilfield industry for many decades. For example, induced gamma ray spectroscopy measurements are commonly used to estimate various formation properties from characteristic gamma rays that are emitted by nuclei that have been moved to excited states by neutron bombardment (e.g., via a pulsed neutron generator deployed in a logging tool). Neutron interactions with formation and other nuclei are commonly distinguished according to the energy of the neutron. After a high energy neutron (e.g., 14.1 MeV) has been emitted by a source, it begins to lose energy by the processes of inelastic and elastic scattering. Inelastic scattering events are generally produced at neutron energies above 1-2 MeV while elastic scattering events occur at lower energies. In inelastic interactions kinetic energy lost by the neutron excites the nucleus, which may in turn emit characteristic "inelastic" gamma rays upon de-excitation. In elastic interactions kinetic energy is transferred from the neutron to the nucleus without a nuclear excitation. As the neutrons approach thermal energies (e.g., less than about 0.05 eV) they are generally absorbed by nuclei in the target, producing excited isotopes that emit characteristic "capture" gamma rays upon de-excitation.

During gamma ray logging operations, gamma rays are detected using a multi-channel detection system that segregates the detected gamma rays into a histogram or multi-channel spectrum based on the energies of the detected gamma rays. Since the channel number corresponds to gamma ray energy, it is desirable that the relationship between channel number and energy be constant and independent of the operating conditions of the spectral acquisition system. To achieve a constant and condition independent relationship, detected gamma ray spectra are generally gain regulated to calibrate the measured gamma ray energies (e.g., to define a conversion between the spectral channel numbers and the energies of the detected gamma rays). However, in many operations the gamma ray logging tool may experience rapid count rate or temperature changes as well as sudden power down and power up events. These may introduce changes to the gain of the spectroscopy system. Gain regulation systems are intended to correct such changes, but are generally slow (e.g., lagging behind the changes that occur during the logging operation). The resulting gain mismatch can cause spectral distortion and a loss of spectral resolution which may in turn cause significant errors in subsequent elemental yield calculations. A need therefore remains for improved spectral acquisition methods that account for or correct such gain changes.

BRIEF DESCRIPTION OF THE DRAWINGS

For a more complete understanding of the disclosed subject matter, and advantages thereof, reference is now made to the following descriptions taken in conjunction with the accompanying drawings, in which:

FIG. 5A depicts the entire spectra while FIG. 5B depicts a low energy portion of the spectra.

FIG. 6A depicts the full spectra while FIG. 6B depicts a low energy portion of the spectra.

FIGS. 7A and 7B (collectively FIG. 7) depict burst and net inelastic spectra obtained in limestone and sandstone formations in which FIG. 7A depicts the full spectra while FIG. 7B depicts a low energy portion of the spectra.

DETAILED DESCRIPTION

Embodiments of this disclosure include systems and methods for gain correcting gamma ray spectra. One example method includes acquiring a gamma ray spectrum including gamma ray counts distributed into a plurality of energy channels, evaluating the acquired gamma ray spectrum to determine an energy of a calibration feature therein, comparing the energy of the calibration feature in the acquired spectrum to a standard spectral energy to determine a deviation between the energy of the calibration feature and the standard spectral energy, and adjusting the acquired spectrum so that the energy of the calibration feature is equal to the standard spectral energy to obtain a gain calibrated spectrum.

Figure 1:
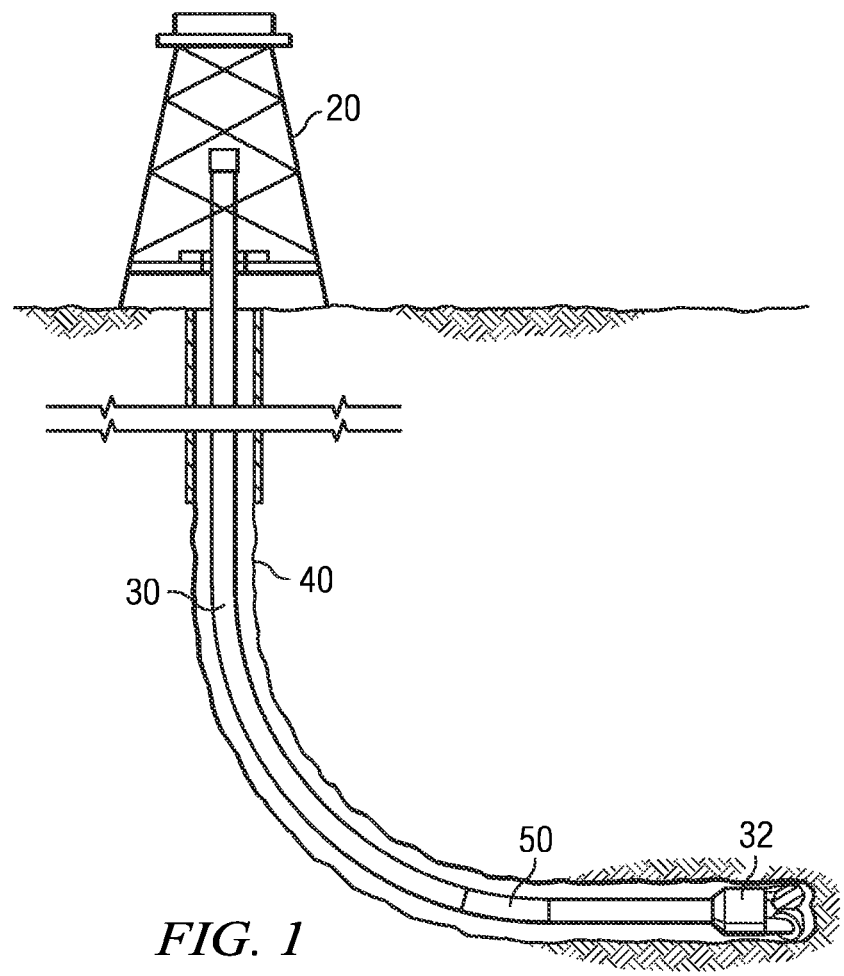
FIG. 1 depicts an example drilling rig including a disclosed gamma ray spectroscopy logging tool.

FIG. 1 depicts an oil or gas drilling rig 20 including an example induced gamma ray logging tool 50. In the depicted embodiment, a land rig 20 is positioned over an oil or gas formation (not shown). The rig may include a derrick and a hoisting apparatus (not shown) for raising and lowering a drill string 30, which, as shown, extends into borehole 40 and includes a drill bit 32 deployed at the lower end of a bottom hole assembly (BHA). The BHA further includes the example gamma ray logging tool 50.

It will be understood that the deployment illustrated on FIG. 1 is merely an example. Drill string 30 may include substantially any suitable downhole tool components, for example, including a steering tool such as a rotary steerable tool, a downhole telemetry system, and one or more additional MWD and/or LWD tools including various sensors for sensing downhole characteristics of the borehole and the surrounding formation. The disclosed embodiments are by no means limited to any particular drill string configuration.

It will be further understood that the disclosed embodiments are not limited to use with a land rig, but are equally well suited for use with either onshore or offshore subterranean operations. Moreover, disclosed embodiments are not limited to logging while drilling embodiments as illustrated on FIG. 1. The disclosed embodiments are equally well suited for other LWD operations such as coiled tubing LWD operations and through-the-bit LWD operations. Moreover, the disclosed embodiments may be implemented with substantially any gamma ray spectroscopy logging tool, including wireline logging tools, slickline logging tools, and also the analysis of natural gamma rays or activation gamma rays acquired from mud samples at the surface.

Figure 2:
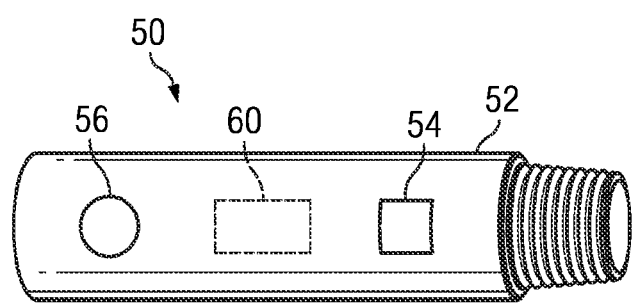
FIG. 2 schematically depicts one example embodiment of the gamma ray spectroscopy logging tool shown on FIG. 1.

FIG. 2 schematically depicts one example embodiment of an induced gamma ray spectroscopy logging tool 50. The tool 50 may include a neutron source 54 deployed in a tool collar 52 (or an internal mandrel). The tool collar 52 and optional internal mandrel may be referred to collectively herein as a tool body. The neutron source 54 may include substantially any suitable neutron source, for example, including a sealed chemical source, such as a $^{241}$AmBe source or a $^{252}$Cf source, or an electrical source. Suitable electrical neutron sources may be substantially continuous or pulsed and commonly make use a deuterium-tritium (D-T) nuclear reaction, a deuterium-deuterium (D-D) nuclear reaction, and/or a tritium-tritium (T-T) nuclear reaction. Pulsed neutron generator (PNG) neutron sources are commonly used in the industry. Logging tool 50 further includes a gamma ray detector 56 deployed in the tool collar 52, for example, axially offset from the neutron source as depicted. The gamma ray detector 56 may include substantially any suitable gamma ray detector, for example, including a sodium iodide (NaI) scintillator crystal and a photomultiplier. Such gamma ray detectors are also commonly used in the industry. Logging tool 50 may further include a neutron detector, another gamma ray detector, or substantially any other detectors. The disclosed embodiments are not limited in this regard.

With continued reference to FIG. 2, logging tool 50 may further include an electronic controller 60 including one or more processors (e.g., microprocessors) and electronic memory. The controller 60 may include processor executable instructions (e.g., stored in memory) configured to cause the neutron source 54 (e.g., a PNG) to emit neutrons in a predetermined emission sequence (e.g., in pulses having predetermined pulse lengths and pulse intervals). The controller may be further configured to receive electrical/electronic signals from the gamma ray detector 55 and to process the signals to generate gamma ray counts or gamma ray spectra including the number of detected gamma rays (gamma ray counts) in each of a number of distinct energy channels (e.g., up to and exceeding several hundred distinct channels). The controller 60 may still further include processor executable instructions configured to execute the disclosed methods steps described in more detail below (with respect to FIGS. 8A and 8B), for example, to gain correct or spectrally align acquired gamma ray spectra. It will, of course, be understood that the disclosed embodiments are not limited to the use of or the configuration of any particular controller hardware, firmware, and/or software.

Figure 3:
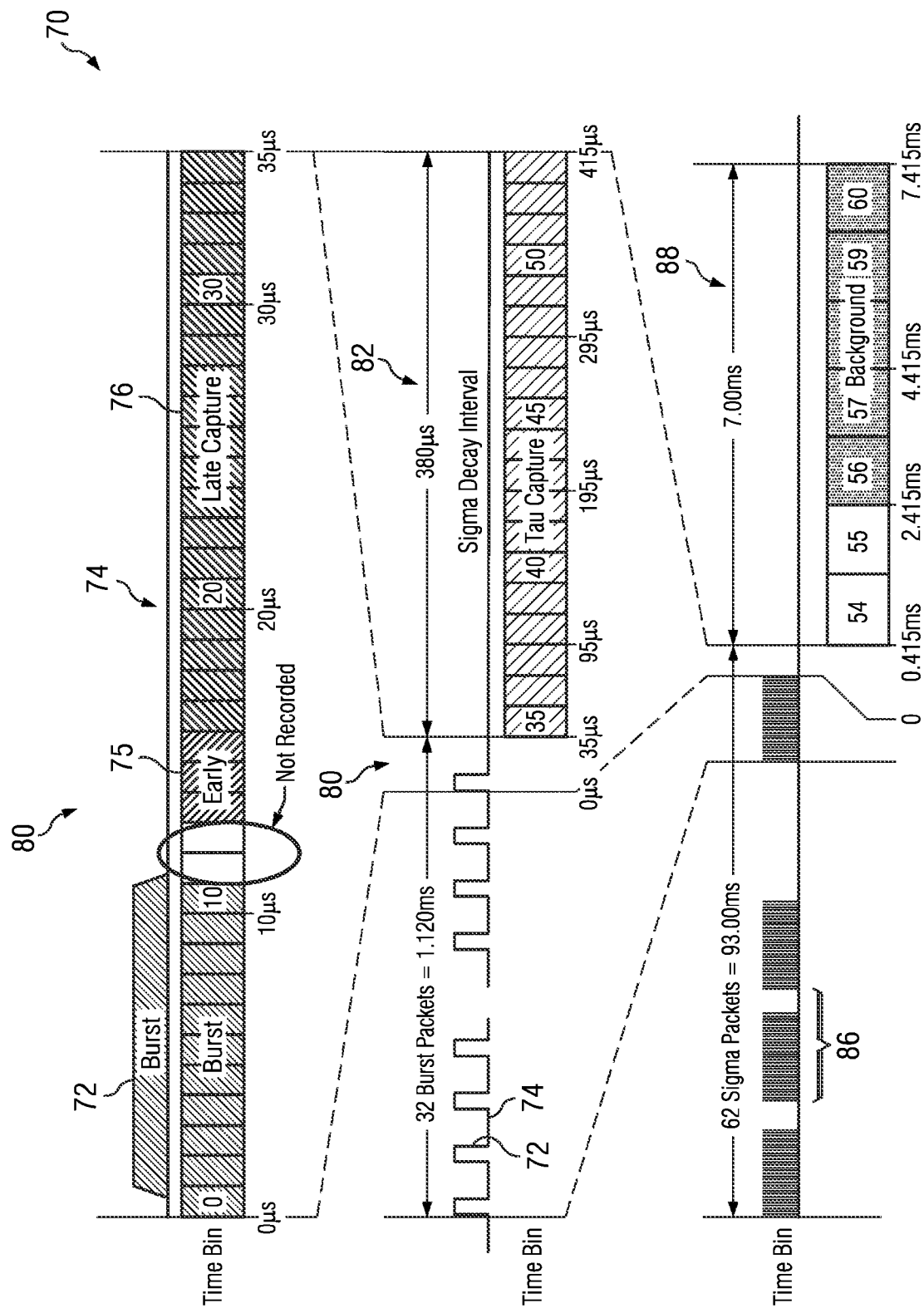
FIG. 3 depicts one example timing sequence that may be used by a PNG neutron source to generate high energy neutrons.

FIG. 3 depicts one example PNG timing sequence 70 that may be used by neutron source 54 to generate high energy neutrons (e.g., bursts of 14-MeV neutrons). The depicted example timing sequence includes a series of short duration neutron bursts 72 (e.g., each burst being 10 microseconds in duration). Each burst 72 may be followed by a corresponding short capture interval 74 in which no neutrons are generated (e.g., a 25-microsecond duration). Moreover, as depicted, the capture interval 74 may be divided into early 75 and late 76 capture intervals, for example, having corresponding durations of 3 microseconds and 20 microseconds following a 2 microsecond duration pause interval in which no gamma rays are accumulated. This burst packet sequence 80 (the sequence of neutron bursts 72 and capture intervals 74) may be repeated substantially any suitable number of times, for example, 32 times in the depicted example, and may then be followed by a longer capture interval 82 (e.g., a sigma decay interval having a duration of 380 microseconds). This sigma packet sequence 86 (the repeated burst packet sequences 80 and the sigma decay 82) may also be repeated substantially any suitable number of times, for example, 62 times in the depicted example, and may then be followed by a still longer capture interval or background interval 88 (e.g., having a duration of 7 milliseconds). In this example, the overall duration of the PNG timing sequence 70 is 100 milliseconds. It will be appreciated that the depicted PNG timing sequence 70 may be repeated substantially any number of times during a logging operation (e.g., at 100 millisecond intervals). Moreover, those of ordinary skill in the art will readily appreciate that PNG timing sequence 70 is merely an example. The disclosed embodiments are in no way limited to any particular PNG timing sequence configuration.

During a logging operation, high energy neutrons (e.g., 14 MeV) are emitted during the neutron burst portion of a PNG timing sequence (e.g., during bursts 72 in FIG. 3). The emitted neutrons lose energy via inelastic and elastic scattering with nuclei in the surrounding environment. Inelastic scattering events (and the corresponding emission of inelastic gamma rays) generally occur within about 1 microsecond of neutron emission as the neutron energy decreases from 14 MeV to about 1-2 MeV. Neutron capture events (and the corresponding emission of capture gamma rays) generally occur much later than the inelastic scattering events (within the life of a single neutron), e.g., tens or hundreds of microseconds after neutron emission.

However, as described above, neutrons are commonly emitted from a neutron source in a sequence of short bursts and capture intervals. Inelastic gamma rays may be generated during the neutron burst (e.g., within 1 microsecond of neutron generation). Capture gamma rays may be generated during later neutron bursts or capture intervals (e.g., tens or hundreds of microseconds after neutron generation). As a result, the emission of inelastic gamma rays and the emission of capture gamma rays commonly overlap in time. In particular, inelastic gamma rays and capture gamma rays may be detected during neutron bursts. Inelastic gamma rays are generally not detected during the various capture intervals such that primarily capture gamma rays may be detected during these intervals (during which no neutrons are generated).

During common induced gamma ray logging operations, gamma ray spectra may be accumulated during the neutron bursts as well as during one or more of or some combination of the capture intervals to generate burst spectra and capture spectra. An inelastic gamma ray spectrum (or counts or a count rate depending on the operational objectives) is commonly obtained via subtracting measured capture gamma rays (or some portion or multiple of the capture gamma rays) from the burst gamma rays, for example, as follows:

$$I_{net} = B - \alpha \cdot C \qquad (1)$$

where $I_{net}$ represents net inelastic gamma rays, B represents measured burst gamma rays, C represents measured capture interval gamma rays, and $\alpha$ represents a coefficient that may depend on the length of the spectral acquisition, dead time, the particular capture intervals used to generate the capture spectrum, and other factors, such as the borehole and formation thermal neutron capture cross sections (Sigma). It will be appreciated that while not shown in Eq. (1), background gamma rays (e.g., activation and natural gamma rays) may also be subtracted. The contribution of theses background gamma rays is generally comparatively very small and is therefore neglected in Eq. (1). Similarly, a net capture spectrum may be obtained by subtracting the background from the measured capture spectrum.

Figure 4:
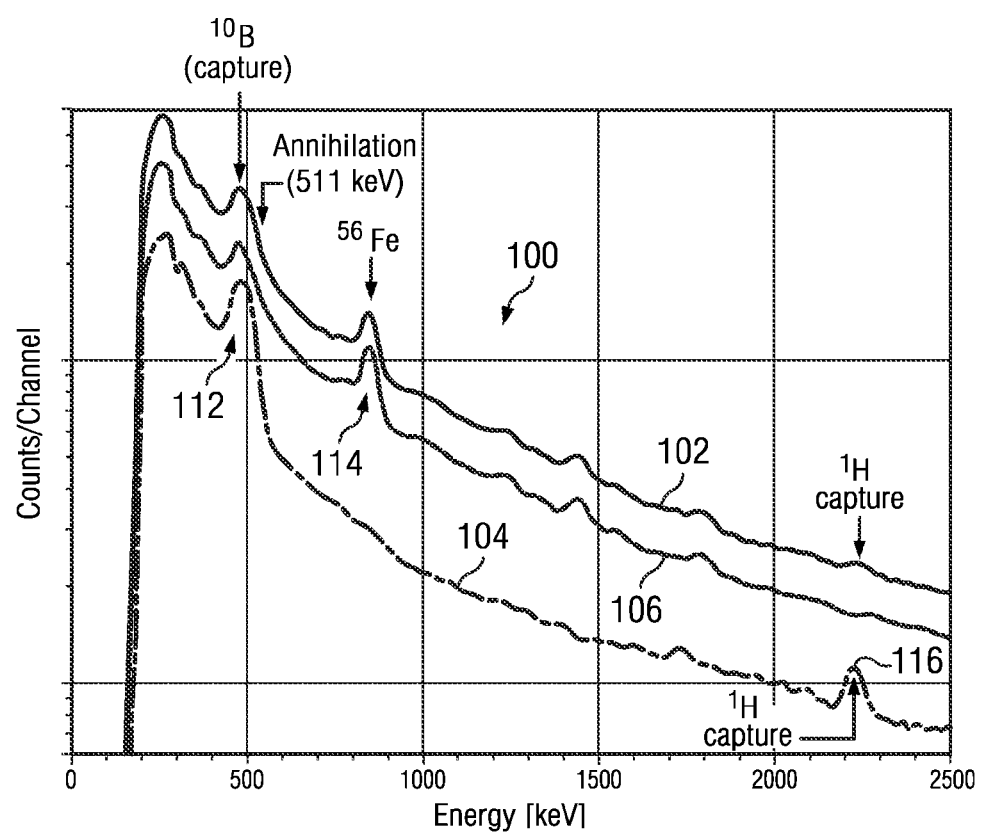
FIG. 4 depicts example gamma ray spectra including a measured burst spectrum, a measured capture spectrum, and a computed net inelastic spectrum.

FIG. 4 depicts example gamma ray spectra 100 including a measured burst spectrum 102, a measured capture spectrum 104, and a computed net inelastic spectrum 106. The burst spectrum was acquired during the neutron burst intervals and the capture spectrum was acquired during certain ones of the capture intervals interspersed among the neutron burst intervals. The net inelastic spectrum was computed by subtracting a fraction of the capture spectrum from the burst spectrum. The depicted spectra 100 include a number of prominent peaks. For example, at about 500 keV there are two spectral lines that overlap in a first prominent peak 112 in each of the spectra. The first line is from the capture reaction $^{10}B(n,\alpha)^7Li$ at 478 keV due to a boron shield deployed in the logging tool to shield thermal neutrons and the second line is from positron annihilation at 511 keV. A second prominent peak 114 is observed in the burst 102 and net inelastic 106 spectra at about 847 keV from the inelastic gamma rays of $^{56}Fe$ as well as activation gamma rays from the decay of $^{56}Mn$ to $^{56}Fe$ ($T_{1/2}=2.57$ h), where the $^{56}Mn$ is the result of the inelastic $^{56}Fe(n,p)^{56}Mn$ reaction. A third prominent peak 116 is observed in the capture spectrum 104 from capture gamma rays following the $^1H(n,\gamma)^2H$ capture reaction.

The example spectra shown in FIG. 4 were accumulated over a time period of about 10 minutes to obtain sufficient statistics for the determination of fitting parameters such as offset, gain, spectral resolution degradation and non-linearity. These parameters may then be used for a time interval by time interval determination of elemental yields after adjusting the standard spectra to make their gain, offset, non-linearity, and spectral resolution match the acquired spectra. To obtain accurate yields it is advantageous that the processed spectra have identical fitting parameters (e.g., identical gains). However, as described in more detail below, gain mismatches commonly occur in downhole gamma ray logging operations and can distort the acquired spectra and result in significant elemental yield errors.

Figure 5A:
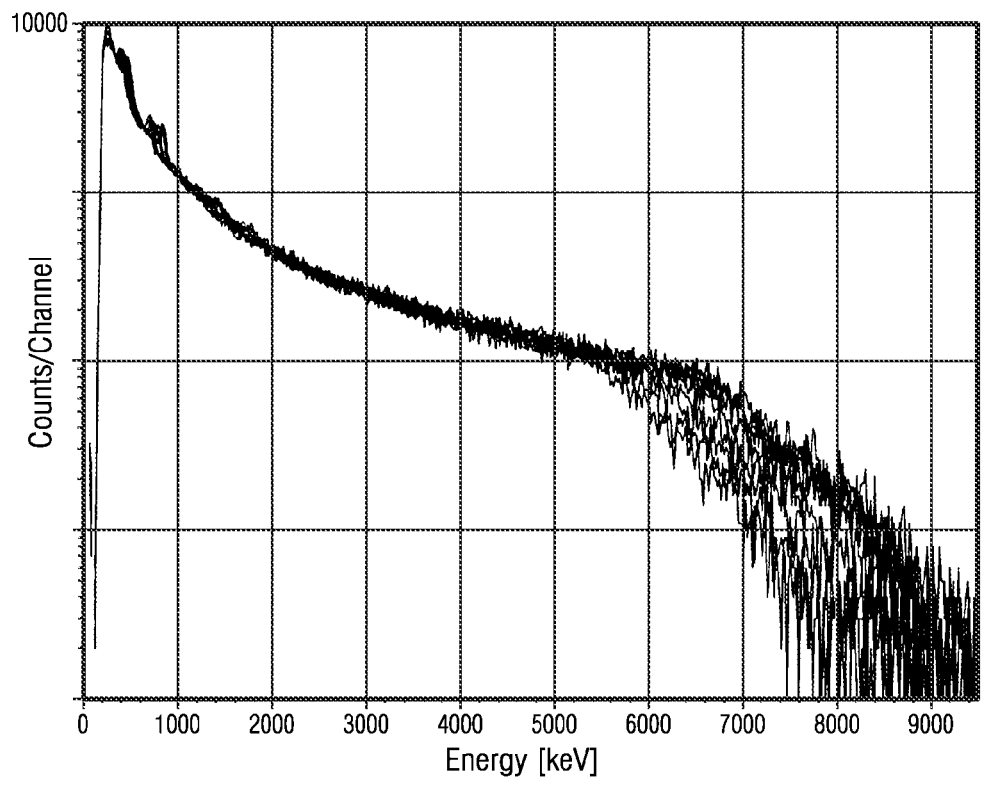
FIGS. 5A and 5B (collectively FIG. 5) depict example spectra collected over short time intervals in which a gain regulation loop is struggling to keep up with gain changes.
Figure 5B:
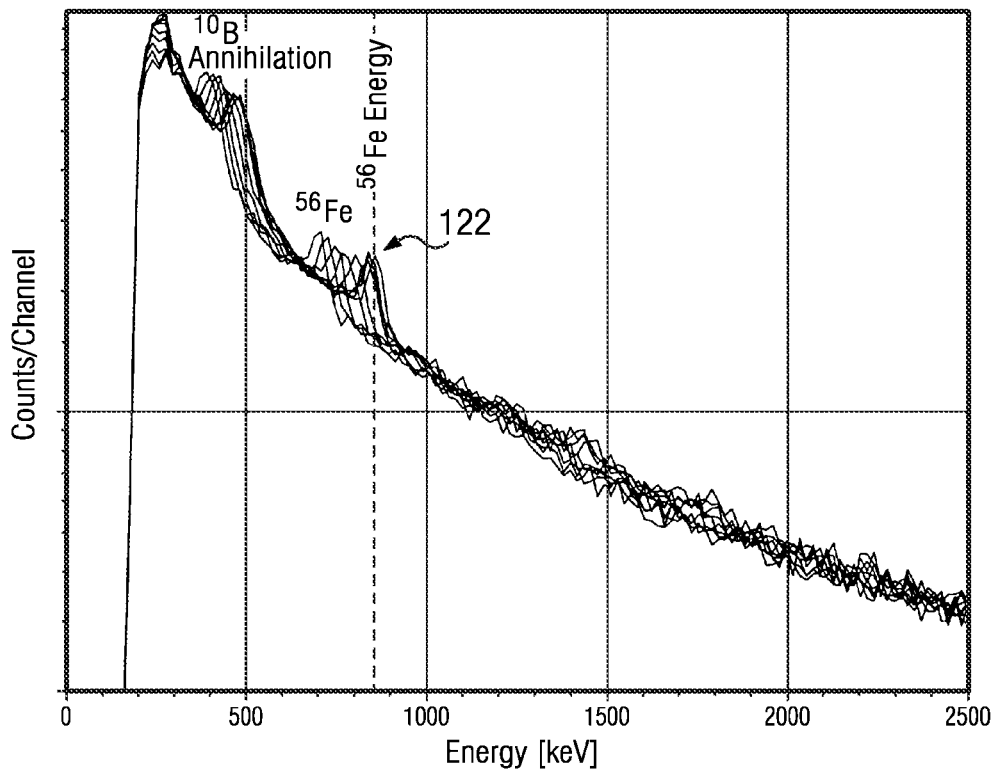

FIGS. 5A and 5B (collectively FIG. 5) depict example spectra collected over short time intervals in which a gain regulation loop was struggling to keep up with gain changes that occurred during the acquisition. Note that the individual spectra differ significantly from one another. This can cause at least two problems. First, if the spectra are added (stacked) to obtain a spectrum from which the fitting parameters may be derived, then the parameters can be biased. And second, if the spectra are processed, they may be processed with incorrect fitting parameters for gain, offset, spectral resolution, and non-linearity, thereby potentially resulting in inaccurate yields. FIG. 5B depicts the low energy portion of the spectra shown on FIG. 5A. Note the peak mismatch at 122 for the $^{56}Fe$ gamma ray peak. The correct location for the $^{56}Fe$ is also indicated.

Figure 6A:
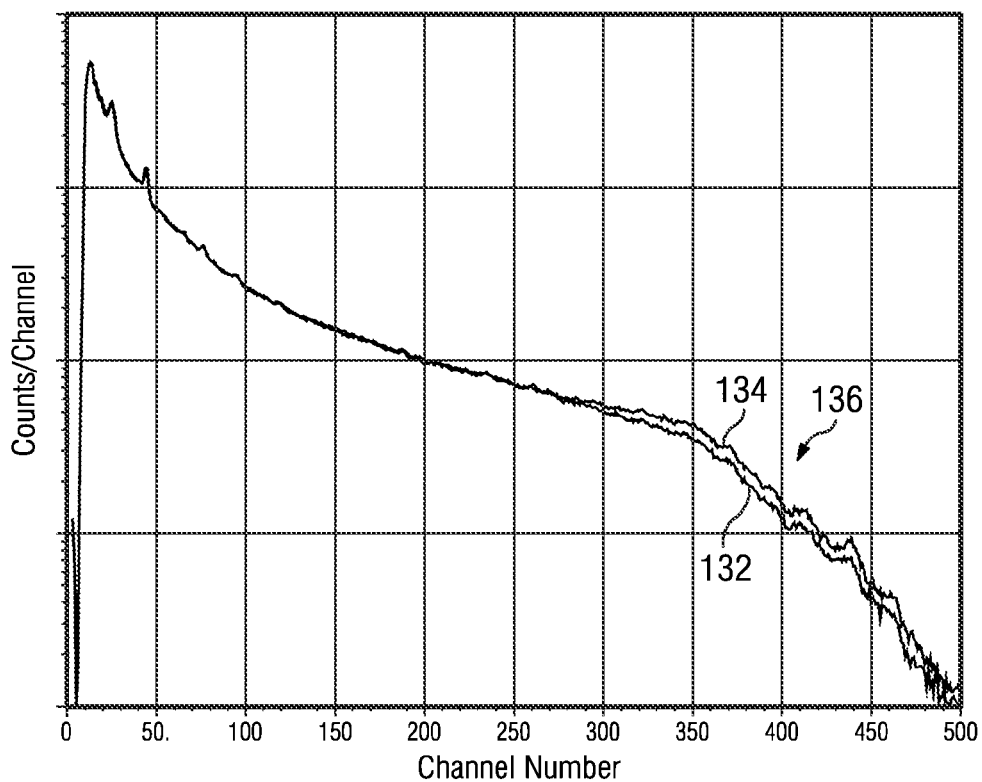
FIGS. 6A and 6B (collectively FIG. 6) depicts first and second spectra obtained via stacking (summing) individual spectra, the first spectrum having a lagging gain regulation and the second spectrum having a constant and well-regulated gain.
Figure 6B:
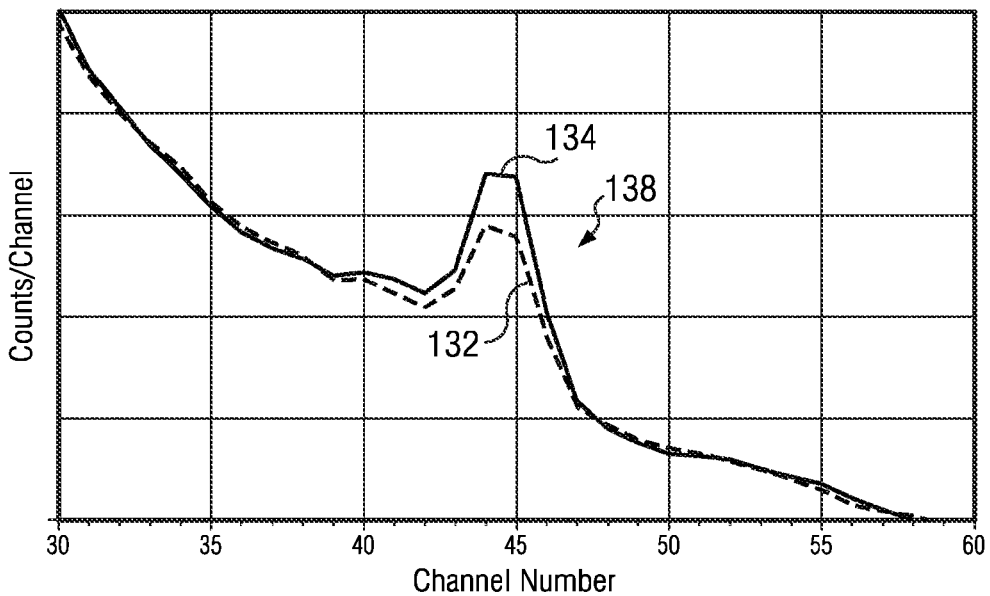

FIGS. 6A and 6B (collectively FIG. 6) depict first and second spectra 132 and 134 obtained via stacking individual spectra. In the first spectrum 132 the gain regulation was lagging, for example, as shown in the spectra of FIG. 5. In the second spectrum 134 the gain was constant and properly regulated. In FIG. 6A the first spectrum is distorted at high energies as depicted generally at 136. Note that the first spectrum has significantly reduced counts at these high energies (about a 20 percent reduction in certain high energy channels). FIG. 6B depicts a low energy portion of the spectra shown on FIG. 6A (from channel 30 to channel 60). Note, in particular, the loss of spectral resolution of the $^{56}Fe$ peak at 138 for the first spectrum 132 (shown as a dashed line) as compared to the second spectrum 134 (solid line).

One aspect of the disclosed embodiments was the realization that this "variable gain" problem may be addressed by postprocessing each individual acquired spectrum to correct the gain calibrations spectrum by spectrum. Such correction may be accomplished, for example, by determining a gain error for each spectrum, correcting the gain error, and recording the corrected spectra. The corrected spectra may then be summed (stacked) to obtain a high-resolution long-time acquisition and accurate fitting parameters. It was further realized that in order to correct the gain error, a feature in the spectrum is needed (referred to herein as a calibration feature or a calibration peak), such as a spectral peak, that is desirably always present irrespective of the formation and not distorted by the presence of other gamma ray lines.

Substantially any suitable spectral peak (referred to herein simply as a peak, peaks, or a feature) may be used to calibrate the spectra in the disclosed embodiments. It will be appreciated that it is generally advantageous that the calibration peak be selected to optimize a number of factors. For example, it is generally advantageous to select a calibration peak for which the peak location can be determined with precision in each of the measured spectra irrespective of the formation composition. Moreover, it is generally advantageous to use a strong peak that is easily distinguished from the background and includes a large number of gamma ray counts to optimize statistics and improve precision. It can also be advantageous to select a high energy peak. While the disclosed embodiments are not limited in this regard, the 847 keV peak has been found to be an advantageous calibration peak in example embodiments disclosed herein.

Figure 7A:
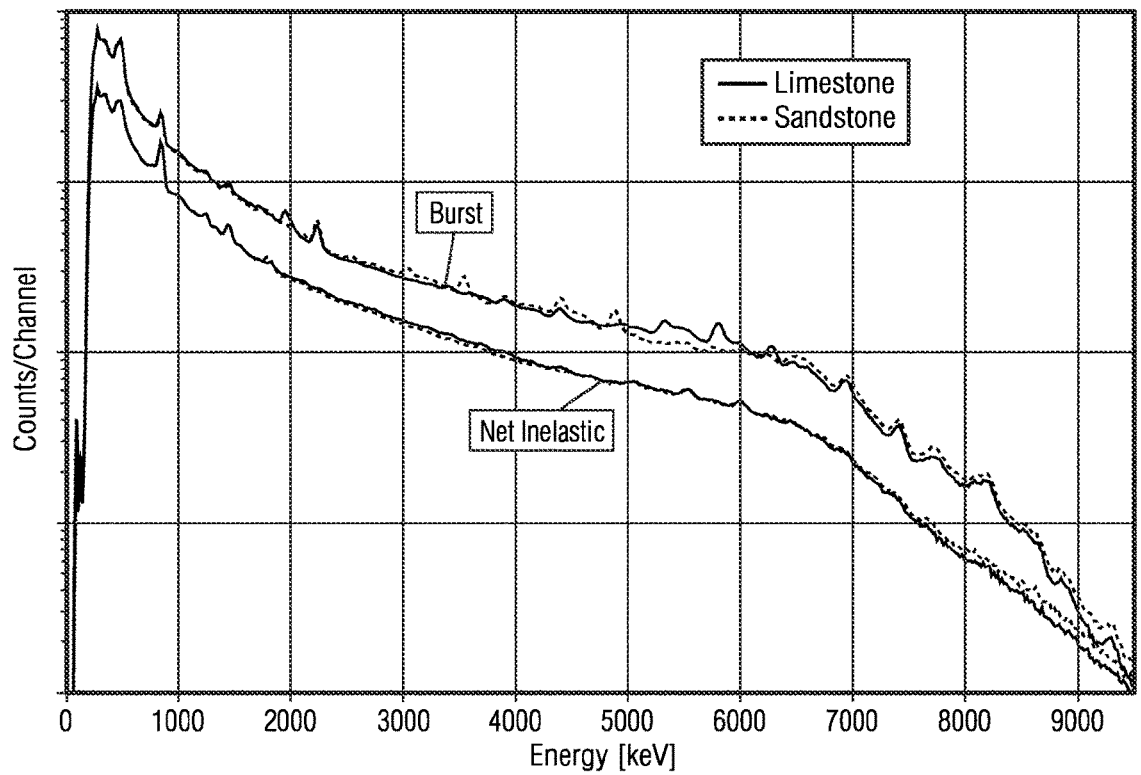
Figure 7B:
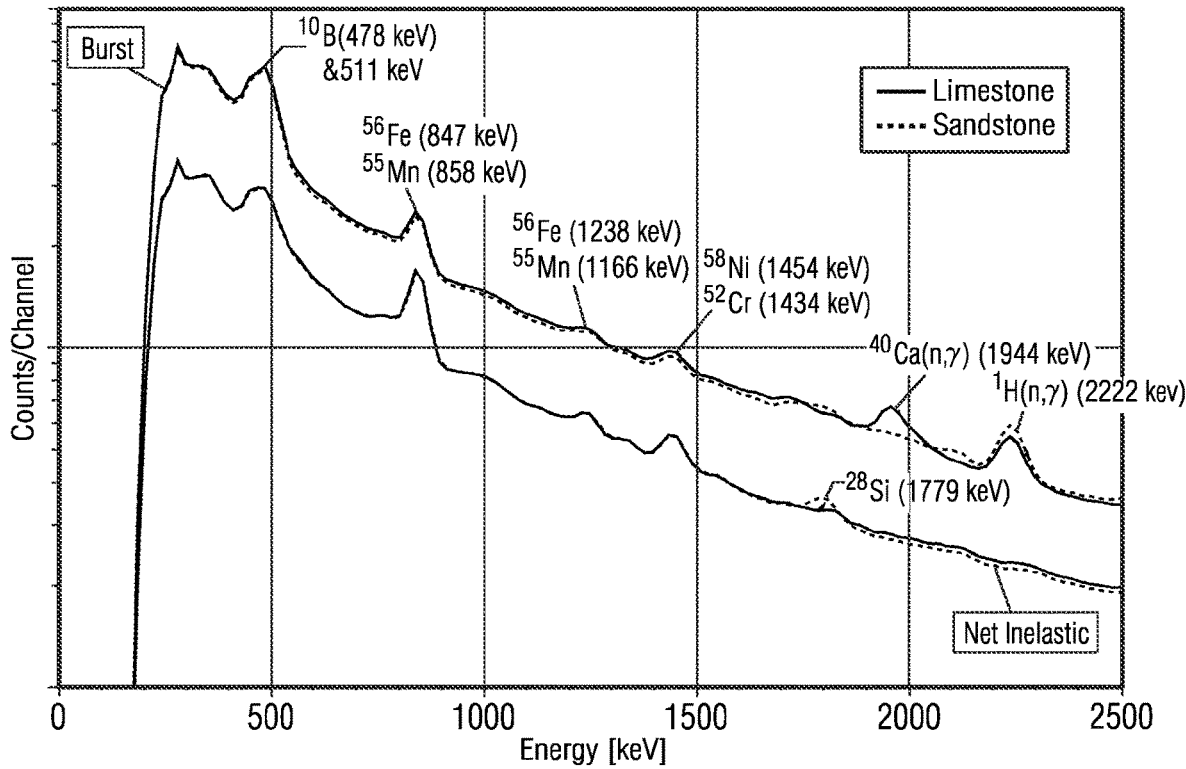

FIGS. 7A and 7B (collectively FIG. 7) depict burst and net inelastic spectra obtained in two of the main lithologies encountered downhole, limestone and sandstone (the limestone spectra are depicted with solid lines while the sandstone spectra are depicted with dashed lines). The elimination of the capture contribution in the net inelastic spectra advantageously leads to a significant reduction in the number of peaks in the depicted spectra. Moreover, as indicated on FIG. 7B, which depicts a low energy portion of the spectra, there are multiple peaks that are present independent of the presence of calcium or silicon (common formation elements). The net inelastic gamma ray peaks are mainly the result of inelastic gamma rays induced by fast neutrons in the tool collar, tool chassis, and flow tube. The net inelastic spectra commonly include peaks from Fe, Mn, Cr, and Ni since the collars, chassis, and flow tubes in common logging tools are primarily made up of manganese (nonmagnetic) steels and stainless steels. In the inelastic spectra shown on FIG. 7, the most dominant peak is centered at about 850 keV and is primarily due to iron (and possibly manganese) in the logging tool. Moreover, note that this peak is largely unaffected by any neighboring gamma ray peaks (as there are no other peaks within several hundred keV on either side) and that this peak is largely independent of the formation surrounding the tool. It has been observed that even in dolomite $(CaMg)(CO_3)_2$ containing formations there is no interference of any gamma ray peaks close to 847 keV in the net inelastic spectrum (the closest peak in dolomite is the inelastic excitation of $^{24}$Mg at 1369 keV).

With further reference to FIG. 7A, there are very few high energy peaks in the net inelastic spectrum, mainly those from $^{16}$O and $^{12}$C. Moreover, these peaks depend on the composition of the formation. Carbon is not always present in subterranean formations, which leaves only the oxygen peak at 6130 keV and the first and second escape peaks at 5619 keV and 5108 keV. While these peaks are less intense and broader than the 847 keV $^{56}$Fe peak, they may be suitable calibration peaks for certain applications.

It will be appreciated that one or more peaks in the capture spectrum (not shown on FIG. 7) may also be used for the disclosed spectral (gain) calibration embodiments. However, it should be noted that the capture spectrum may be dominated by gamma rays from neutron capture events in the formation such that it may be difficult to find a well-resolved peak that is present in every spectrum. The 2222 keV peak from the capture reaction in hydrogen may be suitable since hydrogen is always present in the borehole and is often found in the formation. However, in the presence of chlorine, this hydrogen peak may be difficult to discern and can be contaminated by nearby gamma rays from neutron capture in chlorine.

Figure 8A:
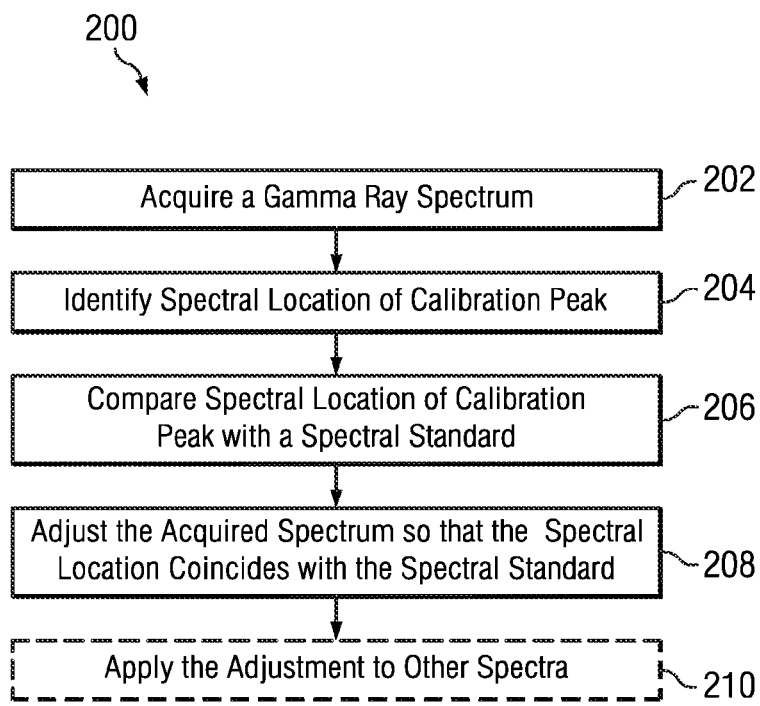
FIGS. 8A and 8B (collectively FIG. 8) depict flow chart of example method embodiments for gain calibrating gamma ray spectra.
Figure 8B:
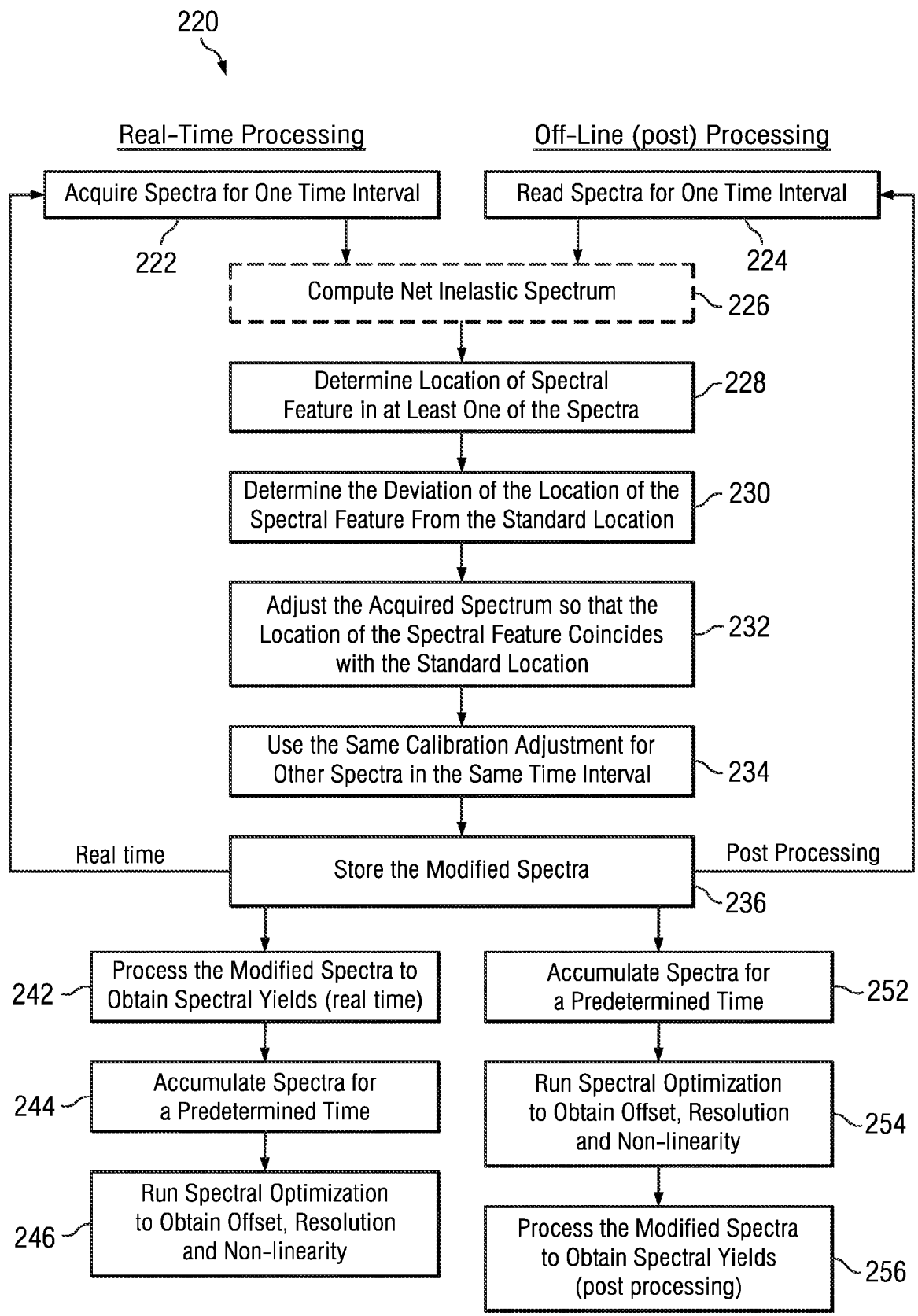

Turning now to FIGS. 8A and 8B (collectively FIG. 8), flow charts of example methods embodiment 200 and 220 for gain correcting (or calibrating) gamma ray spectra are depicted. In FIG. 8A, method 200 include acquiring (e.g., collecting or measuring) at least one gamma ray spectrum obtained over a corresponding time interval (e.g., over a 10, 20, or 30 second interval during a logging operation) at 202. The acquired spectrum may include, for example, a burst spectrum, a capture spectrum, and/or a net inelastic spectrum. The acquired spectrum may be evaluated at 204 to identify the spectral location of a specific (e.g., a predetermined) spectral feature or peak (a calibration peak). In certain advantageous embodiments the calibration peak may include the $^{56}$Fe peak as described above. The identified spectral location may be compared with a standard spectral location at 206 to determine or quantify a difference (or deviation) between the feature location in the acquired spectrum and the standard. The acquired spectrum may then be adjusted at 208 such that the spectral location of the calibration peak coincides with the standard spectral location. The adjustment may include, for example, a scaling (such as a stretching or compressing) of the spectral axis as described in more detail below. The adjustment may then be optionally applied to any other spectra acquired in the same time interval at 210 (e.g., an adjustment made to a net inelastic spectrum may then be applied to a capture spectrum). It will be appreciated that method 200 may be completed substantially any number of times to independently calibrate spectra made over many time intervals during a logging operation. Moreover, method 200 may be applied in real time while logging (e.g., spectrum by spectrum as the spectra are acquired during the operation) or during post processing after the logging operation is completed. The disclosed embodiments are not limited in this regard.

In method 220 (FIG. 8B), the gamma ray spectra may be acquired at 222 or 224 (where spectra are acquired in real time while logging at 222 or after the completion of a logging operation or a portion thereof at 224). The acquired spectrum may include, for example, a burst spectrum and/or a capture spectrum (e.g., as described above with respect to FIG. 3) and may optionally be further processed at 226 to compute a net inelastic spectrum (e.g., by subtracting some portion of a capture spectrum from a burst spectrum as described above). In certain embodiments, it may be advantageous to compute the net inelastic spectrum at 226 since such spectra tend to be insensitive to the formation surrounding the logging tool and generally do not include capture gamma rays. Moreover, the net inelastic spectrum tends to have an improved peak-to-background ratio for the $^{56}$Fe peak.

With continued reference to FIG. 8B, at least one of the spectra acquired at 222 or 224 and/or computed at 226 may be evaluated at 228 to identify a location (e.g., an energy or channel) of a calibration feature. The identified location may be compared with a standard at 230 to determine a difference (or deviation) between the two. The acquired or computed spectrum may then be adjusted at 232 so that the location of the calibration peak coincides with the standard location. This same adjustment may then be applied to any other spectra acquired in the same interval at 234. For example, in embodiments in which a net inelastic spectrum is used to obtain the calibration (using the above-described process), the calibration (the adjustment) may then also be applied to the burst and/or capture spectra at 234. After storing the calibrated (adjusted) spectra at 236, another spectrum may be acquired at 222 and 224 and the calibration process repeated any number of times to obtain a plurality of calibrated spectra.

While certain advantageous embodiments make use of a pulsed neutron source, the disclosed embodiments are expressly not limited in this regard. The neutron source may also be a continuous electric neutron source (neutron generator) or a radio-isotopic neutron source such as a $^{241}$AmBe source or a $^{252}$Cf source. In such embodiments, it may not be possible to separate the inelastic and capture gamma ray spectra. Moreover, in embodiments that make use of a low (or lower) energy neutron source, such as an electric D-D or T-T source or an $^{241}$AmBe or $^{252}$Cf chemical source, there may be fewer or practically no inelastic gamma rays generated. In such embodiments, a capture gamma ray spectrum may be selected for the spectral realignment described herein and the selection of a particular calibration feature (peak) may depend on the nature of the spectrum. In many such logging applications, the 2222 keV peak from the capture reaction in hydrogen may be advantageously used since hydrogen is always present in the borehole (and is often present in the formation). However, it will be appreciated that care should be taken in chlorine (chloride) containing environments since gamma rays generated from neutron capture in chlorine nuclei may interfere with the hydrogen peak.

It will be appreciated that the process of acquiring spectra and the calibrating thereof may be repeated for the duration of a logging operation. In postprocessing embodiments, the uncorrected spectra may be read, aligned, stacked, optimized and then processed. This is repeated over the entire log or over a selected interval of the log. The optimized parameters obtained with the stacked spectra are then applied to the aligned spectra of the same interval. In real time embodiments, the optimization interval lags the reprocessing time frame such that certain parameters used for the time frame-by-time frame or level-by-level acquisition come from the preceding accumulation interval, or at the beginning from parameters adapted from a calibration or from default parameters.

As further depicted in method 220, the calibrated spectra (stored at 236) may be processed to obtain spectral yields and may also be accumulated (e.g., stacked or summed to improve statistics) over a predetermined number of time intervals and then further processed to obtain offset, spectral resolution, and non-linearity parameters. For example, in real-time embodiments, the calibrated spectra (e.g., a calibrated capture spectrum) may be processed to obtain spectral yields at 242, for example, via fitting the spectra with a plurality of spectral standards as is known in the industry. The calibrated spectra may then be accumulated over a predetermined number of time intervals at 244 to obtain a stacked spectrum that may be further processed at 246 (e.g., via a spectral optimization routine) to obtain offset, spectral resolution, and non-linearity parameters. In post processing embodiments, the calibrated spectra may be accumulated over a predetermined number of time intervals at 252 to obtain a stacked spectrum that may be further processed at 254 (e.g., via a spectral optimization routine) to obtain offset, spectral resolution, and non-linearity parameters. Each of the individual calibrated spectra (stored at 236) may then be processed to obtain corresponding spectral yields at 256, for example, via fitting the calibrated spectra with a plurality of spectral standards as is known in the industry.

With continued reference to FIG. 8, the comparison at 206, 230 may advantageously include computing a ratio of the measured peak location to the standard peak location to establish a spectral gain (or gain error), for example, as follows: $g = \text{peak}_{measured}/\text{peak}_{standard}$, where g represents the spectral gain and $\text{peak}_{measured}$ and $\text{peak}_{standard}$ represent the measured and standard peak positions (e.g., each represented as a gamma ray energy or alternatively as a spectral channel number). This gain may be applied to the measured spectrum at 208, 232, for example, by multiplying the spectral axis (or channel number) by the gain (thereby stretching or compressing the horizontal axis of the spectrum). For example, when $\text{peak}_{measured}$ is less than $\text{peak}_{standard}$ the computed gain is less than one (the system gain is underregulated) and the spectral axis may be compressed such that standard peak position coincides with the measured peak position. When $\text{peak}_{measured}$ is greater than $\text{peak}_{standard}$ the computed gain is greater than one (the system gain is overregulated) and the spectral axis may be expanded such that standard peak position coincides with the measured peak position.

Figure 9:
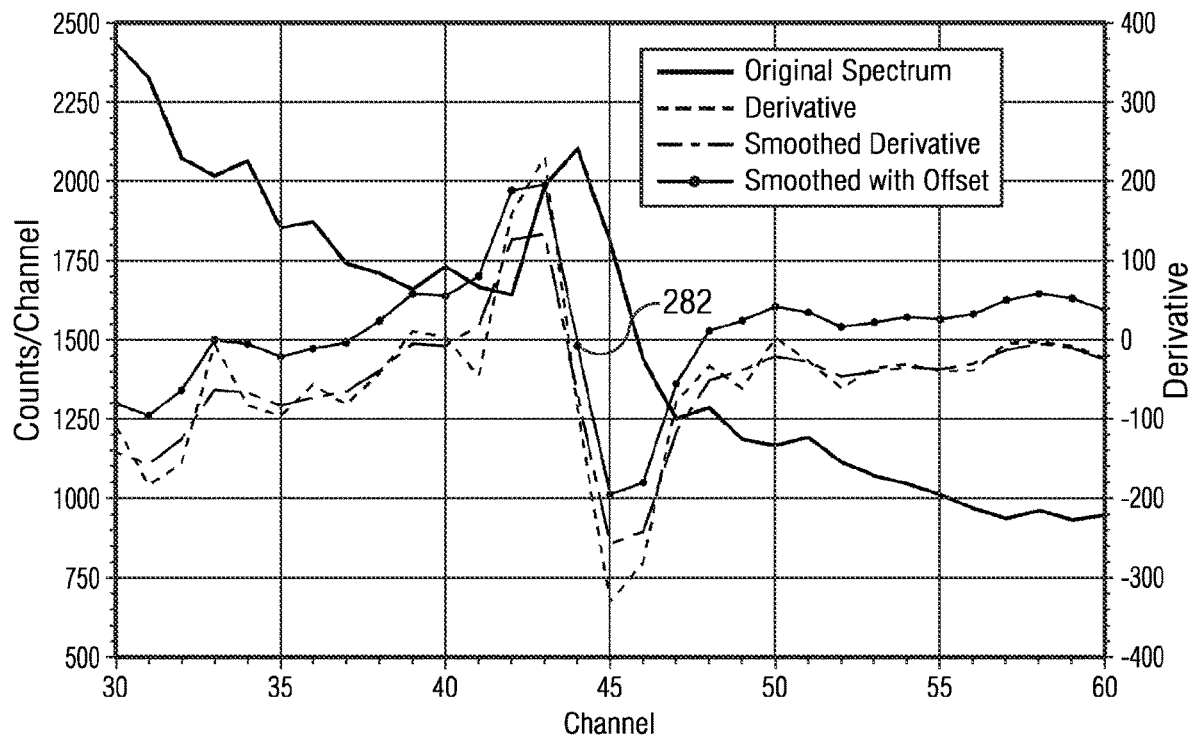
FIG. 9 depicts an example spectrum and a corresponding differentiated spectrum, smoothed differentiated spectrum, and smoothed differentiated spectrum after offset correction over a limited energy window.

The acquired spectra may be processed to determine the measured peak location $\text{peak}_{measured}$ using substantially any suitable techniques. For example, a measured spectrum may be differentiated over a limited number of channels such as is disclosed in commonly assigned U.S. Pat. No. 8,907,270. FIG. 9 depicts a comparison of an example initial spectrum, and a corresponding differentiated spectrum, smoothed differentiated spectrum, and smoothed differentiated spectrum after offset correction over a limited energy window (channels 30 to 60). The original spectrum is depicted as a solid line as indicated and the differentiated spectrum (the derivative) is shown as a dashed line. In this particular example, the differentiated spectrum was obtained as follows:

$$dSp(i) = \frac{(sp(i+1) - sp(i-1))}{2} \quad (2)$$

where dSp(i) represents the spectrum derivative at channel i and sp(·) represents the spectral count of a particular spectral channel. Since derivatives of numerical or statistical data can be noisy, the derivative may be smoothed or averaged using any suitable smoothing routines, for example, as follows:

$$dSm(i) = 0.25\ dSp(i-1) + 0.5\ dSp(i) + 0.25\ dSp(i+1) \quad (3)$$

where dSm(i) represents the smoothed derivative at channel i. Maximum and minimum values (dmax and dmin) of the smoothed derivative and corresponding channel numbers (imax and imin) may be determined using any suitable algorithm. Note that the smoothed derivative is generally not symmetric about zero (e.g., since the peak tends to be located on a background spectral slope). This lack of symmetry may be corrected by determining an offset, for example, via computing an average offset a few channels to the left and to the right of the structure in the derivative or simply by computing the average of dmin and dmax. The computed offset may then be subtracted from the smoothed derivative. The peak location 282 may then be determined by computing a location of a zero intercept of the smoothed derivative, for example, as follows:

$$\text{peak}_{measured} = i_+ + \frac{dSm(i_+)}{dSm(i_+) - dSm(i_-)} \quad (4)$$

where $i_+$ and $i_-$ represent the last positive channel number prior to the zero intercept and the first negative channel number after the zero intercept respectively and $dSm(i_+)$ and $dSm(i_-)$ represent the smoothed derivatives at channel numbers $i_+$ and $i_-$.

It will, of course, be appreciated that determining the measured peak location is not limited to the above-described approach. Other techniques may be utilized. For example, a fitted background may be subtracted from the peak to obtain the net peak centroid (or central location) which may be taken as the measured peak position. In another example, the peak may be fit with a mathematical function such a Gaussian and a modelled background. The center location of the function (e.g., Gaussian) may then be taken as the measured peak position.

With reference again to FIG. 8, the acquired spectrum may be adjusted at 208, 232, for example, via rescaling the spectral channels (the horizontal axis of the spectrum) by the computed gain (determined in 206, 230). Such rescaling may include multiplying the upper and lower locations of each channel by the computed gain to obtain rescaled channels. For example, the adjusting 208, 232 may include rescaling the spectral channels and then redistributing the gamma ray counts from the individual channels in the original spectrum to the rescaled channels. In another example embodiment, the adjusting 208, 232 may include rescaling the spectral channels and finding the intercepts of the spectrum with the new locations and then rescaling the gamma ray counts by multiplying the gamma ray counts in each of the rescaled spectral channels by the computed gain. These embodiments are described in more detail below in FIGS. 10 and 11.

Figure 10:
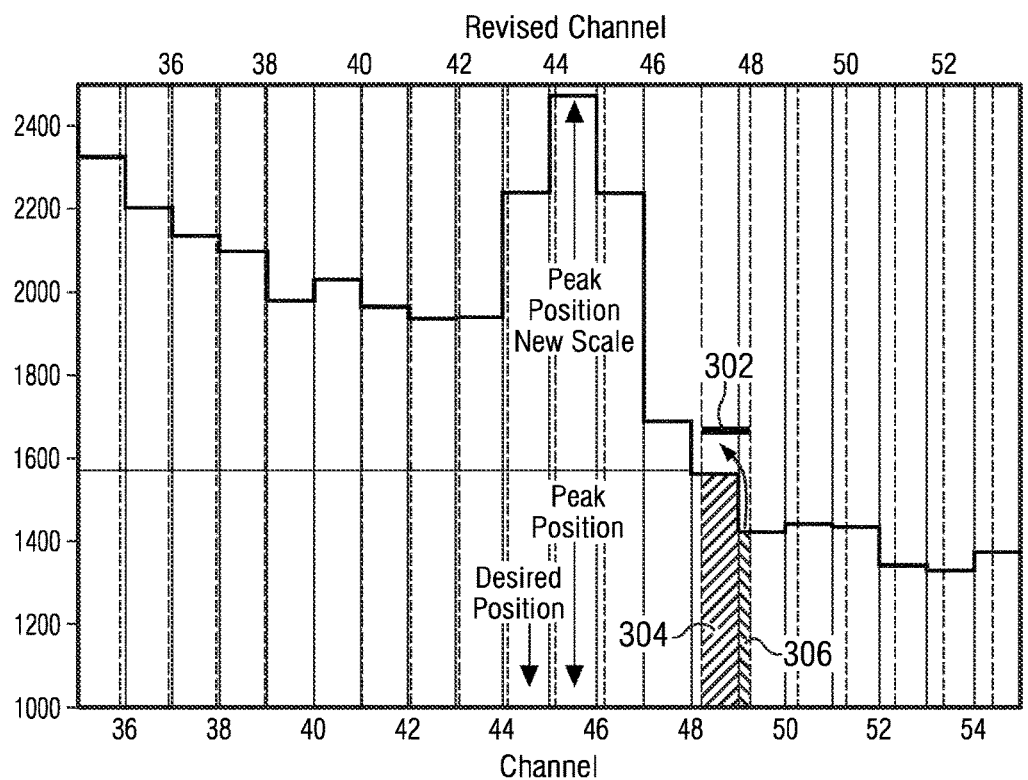
FIG. 10 depicts a portion of a spectrum plotted as a histogram with the counts in each channel n shown between the channels n and n+1.

A first example embodiment is described in more detail with respect to FIG. 10 in which the original spectrum is plotted as a histogram with the counts in each channel n shown between the channels n and n+1. The measured peak position and standard peak position are indicated and result in a gain (or gain factor) g=peak$_{measured}$/peak$_{standard}$=1.025 (in this example). The lower horizontal axis shows the original channel locations while the upper horizontal axis shows the rescaled channel locations in which the energy band of each channel has been stretched by the computed gain (e.g., the upper and lower energy levels of each channel were multiplied by a gain of 1.025). The counts in the histogram may be redistributed from the original channels to the rescaled channels using any suitable interpolation techniques. For example, the counts in each rescaled channel may be assigned by summing a first fraction of the counts from a first one of the original channels and a second fraction of the counts from a second adjacent one of the original channels. For example, in the depicted example, the number of counts in rescaled channel 47 (thick line shown at 302) is the sum of a first fraction of the counts from original channel 48 (shown at 304) and a second fraction of the counts from original channel 49 (shown at 306). It will be appreciated that the vertical location of line 302 is schematic and is only intended to indicate that the number of counts in the rescaled channel is the sum of the counts in shown at 304 and 306. It should be noted that the width of the rescaled channels is larger than the original channels in this example which increases the number of counts per channel. This ensures that the total area of (and the total number of counts in) the recalibrated spectrum remains the same.

Figure 11:
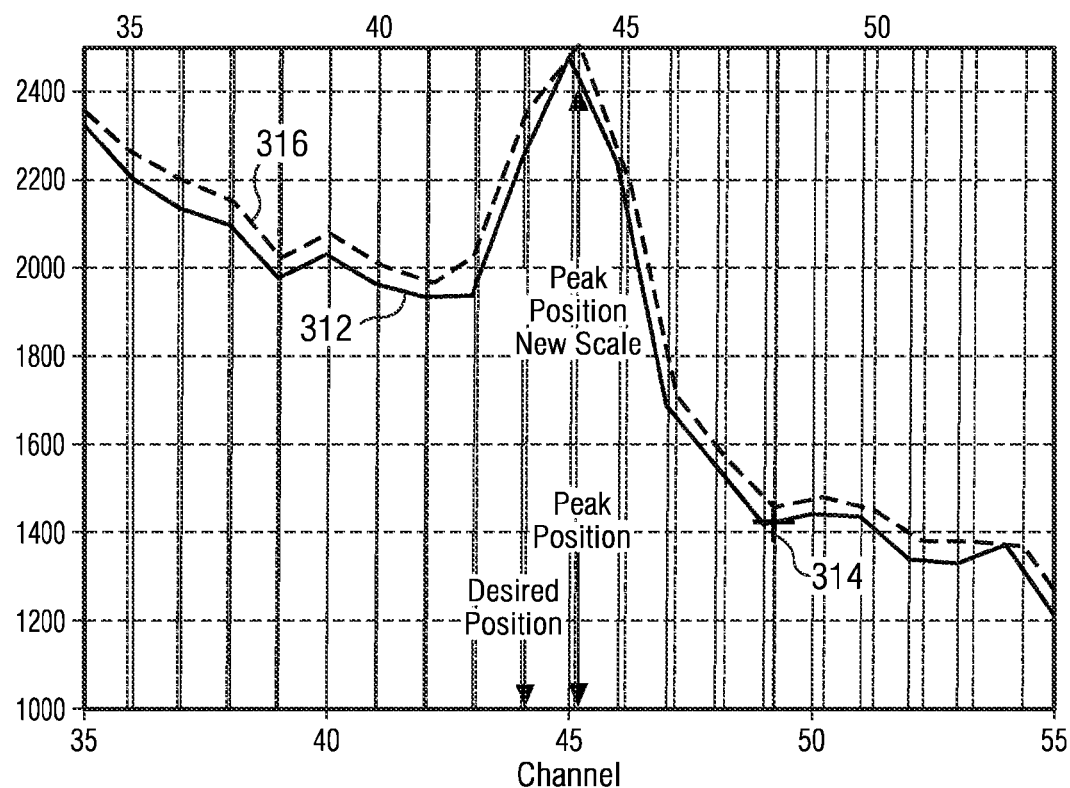
FIG. 11 depicts a portion of a spectrum in which both the spectral axis and the gamma ray counts have been calibrated.

A second example embodiment is described in more detail with respect to FIG. 11, which shows a plot of the original spectrum. The example spectrum 312 is plotted channel by channel with the original channel numbers shown on the lower horizontal axis. The measured peak position and standard peak position are also indicated. The channels were rescaled as shown on the upper horizontal axis. The number of counts in each of the rescaled channels was then determined via interpolation (e.g., linear interpolation) of the adjacent values in the original channels. For example, the number of counts in rescaled channel 48 (at the + sign as indicated at 314) may be determined via interpolating the number of counts in original channels 49 and 50 (e.g., via linear, quadratic, or other polynomial interpolation). The number of counts in each channel may then be multiplied by the gain (e.g., 1.025 in this example) to account for rescaling the width of the channels and to ensure that the total area of (and the total number of counts in) the recalibrated spectrum remains the same (the rescaled counts are shown at 316).

Figure 12:
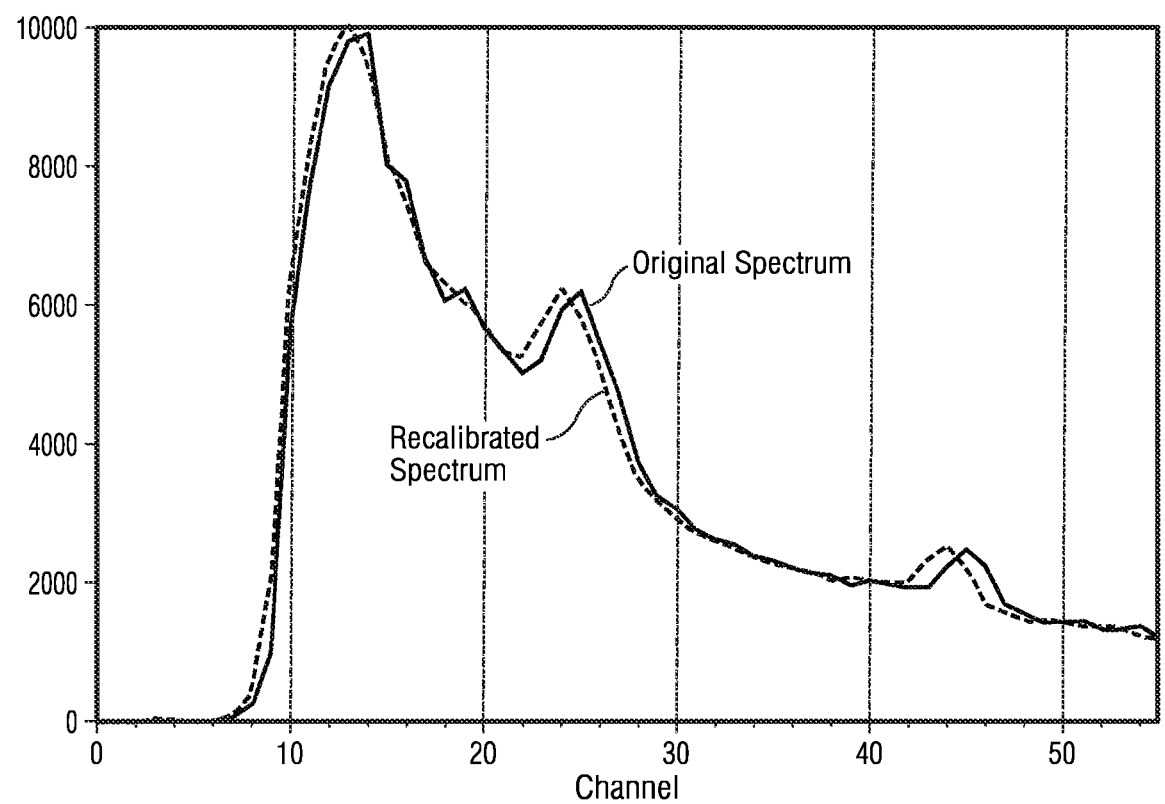
FIG. 12 depicts a low energy portion of the original spectrum and a recalibrated spectrum obtained using the disclosed embodiments described with respect to FIGS. 10 and 11.

FIG. 12 depicts a low energy portion of the original spectrum and recalibrated spectrum obtained using the first and second embodiments described above with respect to FIGS. 10 and 11 (in which the computed gain was 1.025). Note that the first and second recalibrated spectra substantially fully overlap one another. Note also that the recalibrated spectra are scaled to lower channels (collapsed left) and to slightly higher counts.

With reference again to FIG. 8B, the calibrated spectra or accumulated calibrated spectra may be further processed at 242, 256 to obtain spectral yields of a subterranean formation. The spectra may be decomposed into contributions from individual elements, for example, by fitting the sum of standard gamma ray spectra to the calibrated spectra as follows:

$$U_i = \sum_{j=1}^{n} y_j \cdot S_{ij} \quad (5)$$

where $U_i$ represents the value of the calibrated spectrum at channel i, $S_{ij}$ represents spectral standard j at channel i, $y_j$ represents the spectral yield of element j (i.e., the contribution of standard j to the measured spectrum), and n represents the number of standards (or elements) used in the fit. The spectral yields may be computed via a weighted least squares procedure, for example, as disclosed in U.S. Pat. No. 3,521,064, or via an expanded non-linear method as disclosed in U.S. Pat. No. 5,369,578. It will be appreciated that such a fitting algorithm computes a best fit of the calibrated spectrum, for example, via summing spectral contributions from individual elements. The disclosed embodiments are not limited in regard to any particular spectral fitting algorithm.

It will be appreciated that the disclosed embodiments may be extended such that they make use of first and second calibration peaks. In such embodiments, the disclosed method may include determining first and second gains corresponding to the first and second calibration peaks, for example, as follows g1=peak1$_{measured}$/peak1$_{standard}$ and g2=peak2$_{measured}$/peak2$_{standard}$. A net gain may then be derived from the first and second gains and used to adjust the measured spectrum. The net gain may include, for example, a net gain that is a weighted combination or average of the first and second gains or a net gain that is a mathematical function of channel number and mathematically fits the first and second gains. Example first and second standard calibration features may include, for example, the 847 keV peak and one or more of the 2222 keV, 5108 keV, 5619 keV, and the 6130 keV peaks described above.

As described above, the disclosed embodiments are not limited to induced gamma ray spectroscopy applications that make use of a PNG neutron source. The disclosed embodiments may be applied to gamma ray spectra acquired using substantially any suitable measurement techniques. For example, the disclosed embodiments may be applied to induced gamma ray spectra acquired using a chemical neutron source or low power and/or continuous electric generator. Moreover, the disclosed embodiments may be applied to gamma ray spectra acquired during gamma-gamma density logging measurements in which gamma rays are emitted into a wellbore and scatter back to a gamma ray detector. The disclosed embodiments may even be applied to gamma ray spectra acquired during natural gamma ray logging operations.

It will be further appreciated that during a logging operation the gamma ray spectra are generally acquired in time (over predetermined time intervals while logging) and are then later redistributed in depth along the axis of the wellbore. In logging while drilling operations in which the rate of penetration is low, multiple spectra may be acquired during any one depth interval while in operations having a high rate of penetration (or during reaming or wireline operations) there may be fewer than one spectrum per depth interval. It may therefore be desirable to correct/calibrate the acquired spectra (using the disclosed embodiments) prior to performing a time-to-depth conversion.

It will be understood that the present disclosure includes numerous embodiments. These embodiments include, but are not limited to, the following embodiments.

In a first embodiment, a method for gain correcting gamma ray spectra comprises: acquiring a gamma ray spectrum including gamma ray counts distributed into a plurality of energy channels; evaluating the acquired gamma ray spectrum to determine an energy of a calibration feature therein; comparing the energy of the calibration feature in the acquired gamma ray spectrum to a standard spectral energy to determine a deviation between the energy of the calibration feature and the standard spectral energy; and adjusting the acquired gamma ray spectrum so that the energy of the calibration feature is equal to the standard spectral energy to obtain a gain calibrated spectrum.

A second embodiment may include the first embodiment wherein the acquiring the gamma ray spectrum comprises: deploying a logging tool in a subterranean wellbore, the logging tool including a neutron source and a gamma ray detector; causing the neutron source to emit neutrons into the subterranean wellbore; causing the gamma ray detector to detect gamma rays induced by the emitted neutrons; and processing the detected gamma rays to generate the acquired gamma ray spectrum.

A third embodiment may include any one of the first through second embodiments, wherein the acquiring the gamma ray spectrum comprises: acquiring at least a burst spectrum and a capture spectrum; and processing the burst spectrum and the capture spectrum to compute a net inelastic spectrum.

A fourth embodiment may include any one of the first through third embodiments, wherein the calibration feature is a $^{56}$Fe peak and the standard spectral energy is 847 keV.

A fifth embodiment may include any one of the first through fourth embodiments, wherein the deviation is a ratio of an energy of the calibration feature to the standard spectral energy.

A sixth embodiment may include any one of the first through fifth embodiments, wherein the adjusting the acquired gamma ray spectrum comprises multiplying a spectral axis of the acquired gamma ray spectrum by the ratio.

A seventh embodiment may include any one of the first through sixth embodiments, wherein the adjusting the acquired gamma ray spectrum comprises: multiplying upper and lower energy limits of each of a plurality of spectral channels by the ratio to obtain rescaled channels; and redistributing gamma ray counts from channels in the acquired gamma ray spectrum to the rescaled channels.

An eighth embodiment may include any one of the first through sixth embodiments, wherein the adjusting the acquired gamma ray spectrum comprises: multiplying upper and lower energy limits of each of a plurality of spectral channels by the ratio to obtain rescaled channels; interpolating a number of gamma ray counts in each of the rescaled channels; and multiplying the interpolated number in each rescaled spectral channel by the ratio.

A ninth embodiment may include any one of the first through eighth embodiments, further comprising processing the deviation between the energy of the calibration feature and the standard spectral energy in the acquired gamma ray spectrum to calibrate at least one other spectrum and obtain another gain calibrated spectrum.

A tenth embodiment may include any one of the first through ninth embodiments, further comprising fitting the gain calibrated spectrum with a set of elemental spectra to obtain a corresponding set of yields.

An eleventh embodiment may include any one of the first through tenth embodiments, further comprising: repeating the evaluating, the comparing, and the adjusting for a plurality of spectra acquired in a corresponding plurality of time intervals to obtain a corresponding plurality of calibrated spectra; summing the plurality of calibrated spectra to obtain a stacked spectrum; and processing the stacked spectrum via spectral optimization to compute at least one of offset, spectral resolution, and non-linearity parameters.

In a twelfth embodiment a system for logging a wellbore comprises: a neutron source and a gamma ray detector deployed in a logging tool body and a processor including instructions configured to: acquire a gamma ray spectrum including gamma ray counts distributed into a plurality of energy channels; evaluate the acquired gamma ray spectrum to determine an energy of a calibration feature therein; compare the energy of the calibration feature in the acquired gamma ray spectrum to a standard spectral energy to determine a deviation between the energy of the calibration feature and the standard spectral energy; and adjust the acquired gamma ray spectrum so that the energy of the calibration feature is equal to the standard spectral energy to obtain a gain calibrated spectrum.

A thirteenth embodiment may include the twelfth embodiment, wherein: the processor is deployed in the logging tool body; the neutron source comprises a pulsed neutron generator; and the processor includes further instructions to cause the pulsed neutron generator to emit neutrons into a subterranean wellbore, cause the gamma ray detector to detect gamma rays induced by the emitted neutrons, and process the detected gamma rays to generate the acquired gamma ray spectrum.

A fourteenth embodiment may include any one of the twelfth through thirteenth embodiments, wherein: the calibration feature is a $^{56}$Fe peak and the standard spectral energy is 847 keV; and the deviation is a ratio of an energy of the calibration feature to the standard spectral energy.

A fifteenth embodiment may the fourteenth embodiment, wherein the adjusting comprises: multiplying upper and lower limits of each of a plurality of spectral channels by the ratio to obtain rescaled channels; and redistributing gamma ray counts from channels in the acquired gamma ray spectrum to the rescaled channels or interpolating a number of gamma ray counts in each of the rescaled channels and then multiplying the interpolated number in each rescaled spectral channel by the ratio.

In a sixteenth embodiment a method for calibrating gamma ray spectra comprises: acquiring a gamma ray spectrum including gamma ray counts distributed into a plurality of energy channels; evaluating the acquired gamma ray spectrum to determine an energy of a predetermined feature therein; computing a ratio of the energy of the predetermined feature in the acquired gamma ray spectrum to a standard spectral energy; and multiplying a spectral axis of the acquired gamma ray spectrum by the ratio so that the energy of the predetermined feature is equal to the standard spectral energy to obtain a gain calibrated spectrum.

A seventeenth embodiment may include the sixteenth embodiment, wherein: the acquiring the gamma ray spectrum comprises causing a pulsed neutron generator to generate neutron pulses, causing a gamma ray detector to detect gamma rays induced by the generated neutrons, processing the detected gamma rays to generate at least a burst spectrum and a capture spectrum, and processing the burst spectrum and the capture spectrum to compute a net inelastic spectrum; the evaluating comprises evaluating the net inelastic spectrum; the computing comprises computing a ratio of the energy of the predetermined feature in the net inelastic spectrum to the standard spectral energy; and the multiplying comprises multiplying a spectral axis of the net inelastic spectrum by the ratio to obtain a gain calibrated net inelastic spectrum.

An eighteenth embodiment may include the seventeenth embodiment, further comprising: multiplying a spectral axis of at least one of the burst spectrum and the capture spectrum by the ratio to obtain at least one of a corresponding gain calibrated burst spectrum and a gain calibrated capture spectrum.

A nineteenth embodiment may include the eighteenth embodiment, further comprising: fitting at least one of the gain calibrated net inelastic spectrum and the gain calibrated capture spectrum with a set of elemental spectra to obtain a corresponding set of yields.

A twentieth embodiment may include any one of the sixteenth through nineteenth embodiments, wherein: multiplying a spectral axis of the acquired gamma spectrum by the ratio comprises multiplying upper and lower limits of each of a plurality of spectral channels by the ratio to obtain rescaled channels; and the method further comprises redistributing gamma ray counts from channels in the acquired gamma ray spectrum to the rescaled channels or interpolating a number of gamma ray counts in each of the rescaled channels and then multiplying the interpolated number in each rescaled spectral channel by the ratio.

Although a spectral alignment method for induced gamma ray logging has been described in detail, it should be understood that various changes, substitutions and alternations can be made herein without departing from the spirit and scope of the disclosure as defined by the appended claims.

What is claimed is:

1. A method for gain correcting gamma ray spectra, the method comprising:
   acquiring a gamma ray spectrum including gamma ray counts distributed into a plurality of energy channels;
   evaluating the acquired gamma ray spectrum to determine an energy of a calibration feature therein;
   comparing the energy of the calibration feature in the acquired gamma ray spectrum to a standard spectral energy to determine a deviation between the energy of the calibration feature and the standard spectral energy; and
   adjusting the acquired gamma ray spectrum so that the energy of the calibration feature is equal to the standard spectral energy to obtain a gain calibrated spectrum.

2. The method of claim 1, wherein the acquiring the gamma ray spectrum comprises:
   deploying a logging tool in a subterranean wellbore, the logging tool including a neutron source and a gamma ray detector;
   causing the neutron source to emit neutrons into the subterranean wellbore;
   causing the gamma ray detector to detect gamma rays induced by the emitted neutrons; and
   processing the detected gamma rays to generate the acquired gamma ray spectrum.

3. The method of claim 1, wherein the acquiring the gamma ray spectrum comprises:
   acquiring at least a burst spectrum and a capture spectrum; and
   processing the burst spectrum and the capture spectrum to compute a net inelastic spectrum.

4. The method of claim 1, wherein the calibration feature is a $^{56}$Fe peak and the standard spectral energy is 847 keV.

5. The method of claim 1, wherein the deviation is a ratio of an energy of the calibration feature to the standard spectral energy.

6. The method of claim 5, wherein the adjusting the acquired gamma ray spectrum comprises multiplying a spectral axis of the acquired gamma ray spectrum by the ratio.

7. The method of claim 5, wherein the adjusting the acquired gamma ray spectrum comprises:
   multiplying upper and lower energy limits of each of a plurality of spectral channels by the ratio to obtain rescaled channels; and
   redistributing gamma ray counts from channels in the acquired gamma ray spectrum to the rescaled channels.

8. The method of claim 5, wherein the adjusting the acquired gamma ray spectrum comprises:
   multiplying upper and lower energy limits of each of a plurality of spectral channels by the ratio to obtain rescaled channels;
   interpolating a number of gamma ray counts in each of the rescaled channels; and
   multiplying the interpolated number in each rescaled spectral channel by the ratio.

9. The method of claim 1, further comprising processing the deviation between the energy of the calibration feature and the standard spectral energy in the acquired gamma ray spectrum to calibrate at least one other spectrum and obtain another gain calibrated spectrum.

10. The method of claim 1, further comprising fitting the gain calibrated spectrum with a set of elemental spectra to obtain a corresponding set of yields.

11. The method of claim 1, further comprising:
   repeating the evaluating, the comparing, and the adjusting for a plurality of spectra acquired in a corresponding plurality of time intervals to obtain a corresponding plurality of calibrated spectra;
   summing the plurality of calibrated spectra to obtain a stacked spectrum; and
   processing the stacked spectrum via spectral optimization to compute at least one of offset, spectral resolution, and non-linearity parameters.

12. A system for logging a wellbore, the system comprising:
   a neutron source and a gamma ray detector deployed in a logging tool body; and
   a processor including instructions configured to:
      acquire a gamma ray spectrum including gamma ray counts distributed into a plurality of energy channels;
      evaluate the acquired gamma ray spectrum to determine an energy of a calibration feature therein;
      compare the energy of the calibration feature in the acquired gamma ray spectrum to a standard spectral energy to determine a deviation between the energy of the calibration feature and the standard spectral energy; and
      adjust the acquired gamma ray spectrum so that the energy of the calibration feature is equal to the standard spectral energy to obtain a gain calibrated spectrum.

13. The system of claim 12, wherein:
the processor is deployed in the logging tool body;
the neutron source comprises a pulsed neutron generator; and
the processor includes further instructions to cause the pulsed neutron generator to emit neutrons into a subterranean wellbore, cause the gamma ray detector to detect gamma rays induced by the emitted neutrons, and process the detected gamma rays to generate the acquired gamma ray spectrum.

14. The system of claim 12, wherein:
the calibration feature is a $^{56}$Fe peak and the standard spectral energy is 847 keV; and
the deviation is a ratio of an energy of the calibration feature to the standard spectral energy.

15. The system of claim 14, wherein the adjusting comprises:
multiplying upper and lower limits of each of a plurality of spectral channels by the ratio to obtain rescaled channels; and
redistributing gamma ray counts from channels in the acquired gamma ray spectrum to the rescaled channels or interpolating a number of gamma ray counts in each of the rescaled channels and then multiplying the interpolated number in each rescaled spectral channel by the ratio.

16. A method for calibrating gamma ray spectra, the method comprising:
acquiring a gamma ray spectrum including gamma ray counts distributed into a plurality of energy channels;
evaluating the acquired gamma ray spectrum to determine an energy of a predetermined feature therein;
computing a ratio of the energy of the predetermined feature in the acquired gamma ray spectrum to a standard spectral energy; and
multiplying a spectral axis of the acquired gamma ray spectrum by the ratio so that the energy of the predetermined feature is equal to the standard spectral energy to obtain a gain calibrated spectrum.

17. The method of claim 16, wherein:
the acquiring the gamma ray spectrum comprises causing a pulsed neutron generator to generate neutron pulses, causing a gamma ray detector to detect gamma rays induced by the generated neutrons, processing the detected gamma rays to generate at least a burst spectrum and a capture spectrum, and processing the burst spectrum and the capture spectrum to compute a net inelastic spectrum;
the evaluating comprises evaluating the net inelastic spectrum;
the computing comprises computing a ratio of the energy of the predetermined feature in the net inelastic spectrum to the standard spectral energy; and
the multiplying comprises multiplying a spectral axis of the net inelastic spectrum by the ratio to obtain a gain calibrated net inelastic spectrum.

18. The method of claim 17, further comprising:
multiplying a spectral axis of at least one of the burst spectrum and the capture spectrum by the ratio to obtain at least one of a corresponding gain calibrated burst spectrum and a gain calibrated capture spectrum.

19. The method of claim 18, further comprising fitting at least one of the gain calibrated net inelastic spectrum and the gain calibrated capture spectrum with a set of elemental spectra to obtain a corresponding set of yields.

20. The method of claim 16, wherein:
multiplying a spectral axis of the acquired gamma spectrum by the ratio comprises multiplying upper and lower limits of each of a plurality of spectral channels by the ratio to obtain rescaled channels; and
the method further comprises redistributing gamma ray counts from channels in the acquired gamma ray spectrum to the rescaled channels or interpolating a number of gamma ray counts in each of the rescaled channels and then multiplying the interpolated number in each rescaled spectral channel by the ratio.

* * * * *